April 20, 1954 R. F. J. FILIPOWSKY 2,676,202

MULTICHANNEL COMMUNICATION WITH VARYING IMPULSE FREQUENCY

Filed Jan. 11, 1950 6 Sheets-Sheet 1

INVENTOR

Richard Friedrich Josef Filipowsky,

BY Wenderoth, Lind & Ponack

ATTORNEYS

MULTICHANNEL COMMUNICATION WITH VARYING IMPULSE FREQUENCY

INVENTOR
R. F. J. Filipowsky,
By Wenderoth, Lind & Ponack
ATTORNEYS

INVENTOR
Richard Friedrich Josef Filipowsky,
BY Weinderoth, Lind & Ponack
ATTORNEYS

MULTICHANNEL COMMUNICATION WITH VARYING IMPULSE FREQUENCY

Filed Jan. 11, 1950 6 Sheets-Sheet 4

INVENTOR
Richard Friedrich Josef Filipowsky,

BY Wenderoth, Lind & Ponack

ATTORNEYS

MULTICHANNEL COMMUNICATION WITH VARYING IMPULSE FREQUENCY

Filed Jan. 11, 1950 6 Sheets-Sheet 5

R-Return
A-Advance
S.S.-Selecting Signal
S-Signal

INVENTOR
Richard Friedrich Josef Filipowsky,

BY Wenderoth, Lind & Ponack
ATTORNEYS

MULTICHANNEL COMMUNICATION WITH VARYING IMPULSE FREQUENCY

Filed Jan. 11, 1950 6 Sheets-Sheet 6

INVENTOR
Richard Friedrich Josef Filipowsky,
BY Wenderoth, Lind & Ponack
ATTORNEYS Patented Apr. 20, 1954 2,676,202

UNITED STATES PATENT OFFICE 2,676,202

MULTICHANNEL COMMUNICATION WITH VARYING IMPULSE FREQUENCY

Richard F. J. Filipowsky, Carcavelos, Portugal, assignor to Companhia Portuguesa Rádio Marconi, S. A. R. L., Lisbon, Portugal Application January 11, 1950, Serial No. 138,002

Claims priority, application Portugal January 12, 1949

15 Claims. (Cl. 178—43.5)

The present invention relates to an electric multi-channel mechanical impulse communication system with inconstant (varying) impulse repetition frequency.

In several known communication systems the amount of information which can be transmitted in a certain time interval and with a given band-width and safety factor of intelligibility varies immensely.

An ideal system may be defined as one which is able to transmit the greatest amount of information under these conditions. The ratio of the amount really obtained to this ideal quantity of information may be termed the "figure of merit" of the communication system.

In telegraphy and especially in the 5 or 7 unit systems, a high "figure of merit" is obtained. In telephony, however, this is not the case, because during every ordinary conversation there are many intervals where one is listening to the person who is talking and is not speaking at all, but even when one is speaking there are many instants when one is drawing in one's breath or when he is uttering slow vowels. During all these instants no band-width at all, or only a very small one is needed. Only when one is uttering consonants, especially "s," "ss" or "p," are there produced very often-repeated or very steep impulses, and to transmit these, a broad band is needed. Therefore, telephony has a very low "figure of merit."

The present invention is based on the concept of creating a multichannel communication system in which maximum advantage is taken of the allowed band-width, using its greater part always on the channel having at a certain instant the greatest need of this band-width. The greater the number of channels, the smaller are the chances of all of them needing a great band-width at the same time.

The several novel features of the system are illustrated in the accompanying drawings wherein, Figure 1 shows the signal curves transmitted along the different channels which differ in instantaneous complexity and which combine to make up the signal energy being transmitted, for example, speech waves;

The present system uses a special type of time-division impulse transmission, in which the repetition frequency of these impulses is not constant but, on the contrary, is dependent upon the complexity of the signal to be transmitted which varies from one moment to another.

A signal is to be understood as having great complexity when it has great amplitude variations within a small time interval. This means that the frequency spectrum contains the greatest amount of energy in the high frequency regions.

In order to obtain, on the receiving side, the correct distribution of the transmitted signals to the right channels, a selecting signal is transmitted in connection with every amplitude sample impulse. For every channel there is a special selecting signal which corresponds only to this channel. Both these signals, i. e., selecting signal and amplitude signal, can be transmitted by any of the known methods of impulse modulation.

Figure 8:
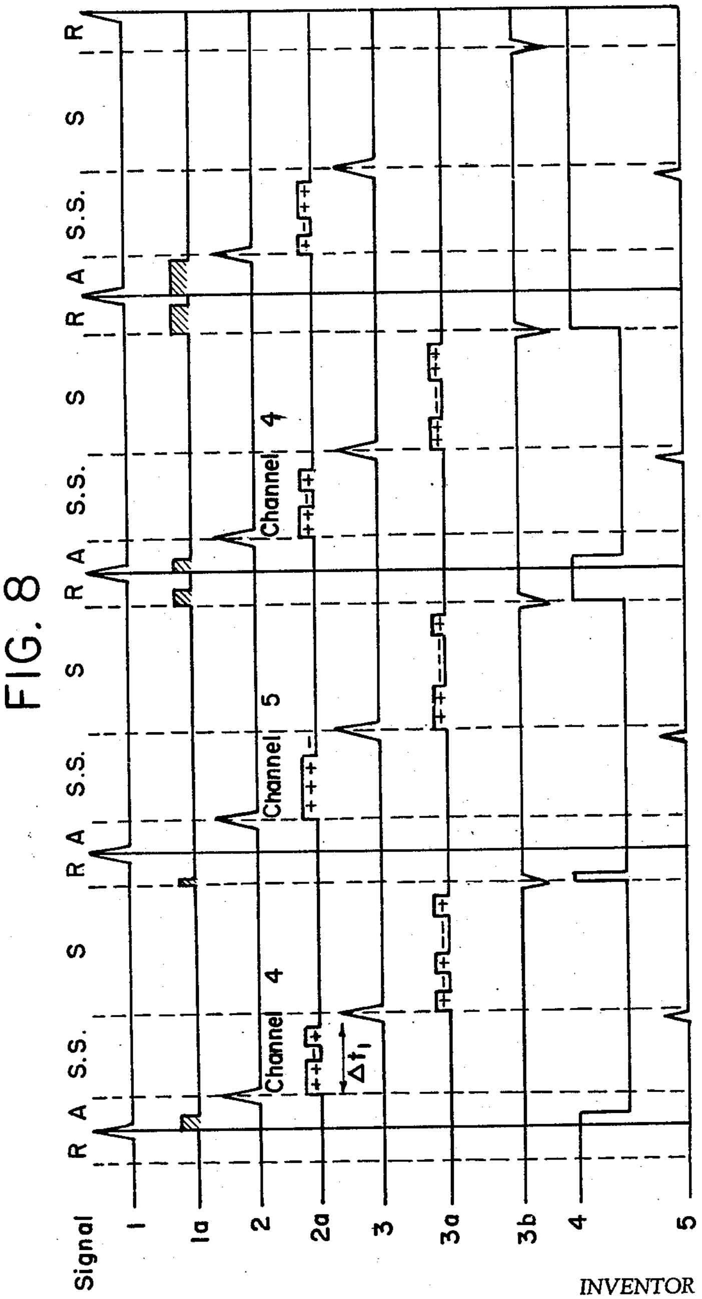
Figure 8 is a graphical illustration of the impulse sequences in the system.

For both signals, for example, a system employing impulse code modulation is shown in Figure 8; it needs a great band-width but has the advantage of having a great safety factor against disturbances.

Figure 9:
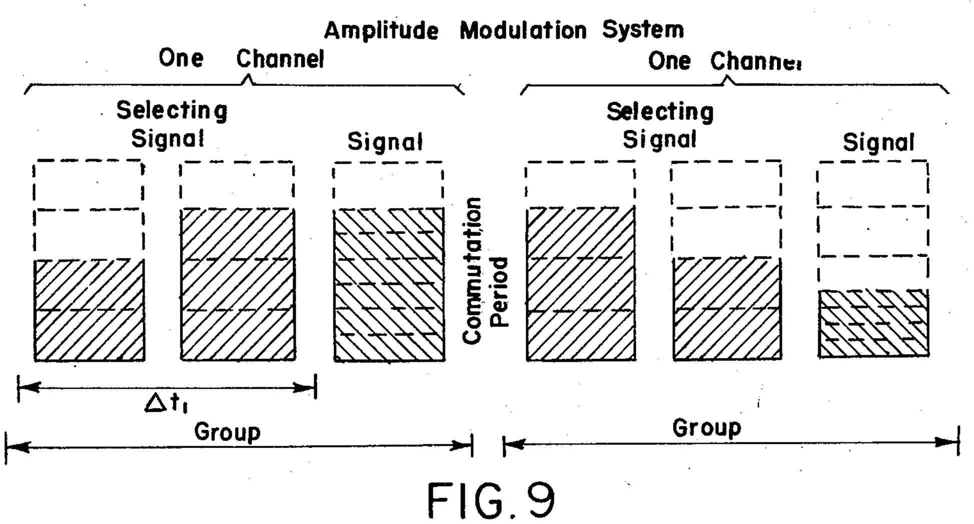
Figure 9 illustrates an amplitude modulation system for deriving the selecting signal.

For the selecting signal, a system employing two impulses modulated in amplitude, is shown in Figure 9. The amplitude of each of these can have any of four different values in order to obtain 16 combinations corresponding to the same number of channels. The amplitude sample of the signal is represented by a single amplitude-modulated impulse which follows the selecting signal. This system needs a smaller band-width than the one shown in Figure 8, but offers less safety against disturbances.

Other systems are conceivable in which both signals could be represented by other combinations of impulses, and if A. C. impulses are used, both signals could be transmitted at the same time.

Figure 1:
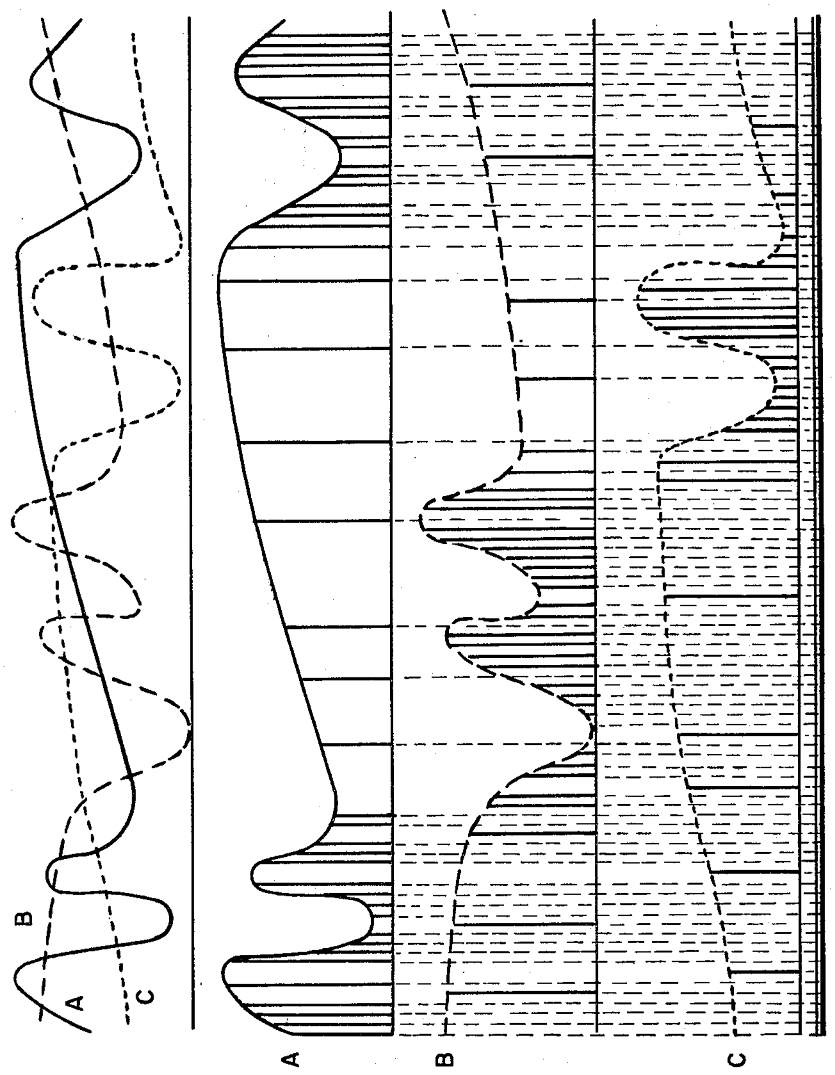

As an example, Figure 1 shows that the signal curves to be transmitted for instance in three channels, within a certain time interval, have different complexities at the same instant. The curve A has more complexity at the beginning; therefore it needs a larger number of sample impulses for defining the value of the amplitude at a given moment. A smaller number of impulses at the parts of the curves B and C where they are not needed as much, are given to other channels, as samples of curves B and C have little complexity at the beginning.

In the very special case where all channels are transmitting simultaneously signals with high complexity the good quality will be affected because the number of spare samples will not be enough, although the human ear is hardly able to detect the consequent degradation of the signal quality.

At a later portion of the signal, curve B needs the greatest number of samples and, therefore, the system automatically transmits more impulses to define curve B and less for A and C, and so on.

Figure 1 thus shows that the impulse repetition frequency of each channel is not constant; but there exists a constant frequency of the impulses generated for all channels considered together, i. e., a constant group repetition frequency. This frequency need not necessarily be constant but this fact helps the practical construction of the equipment.

Figure 2:
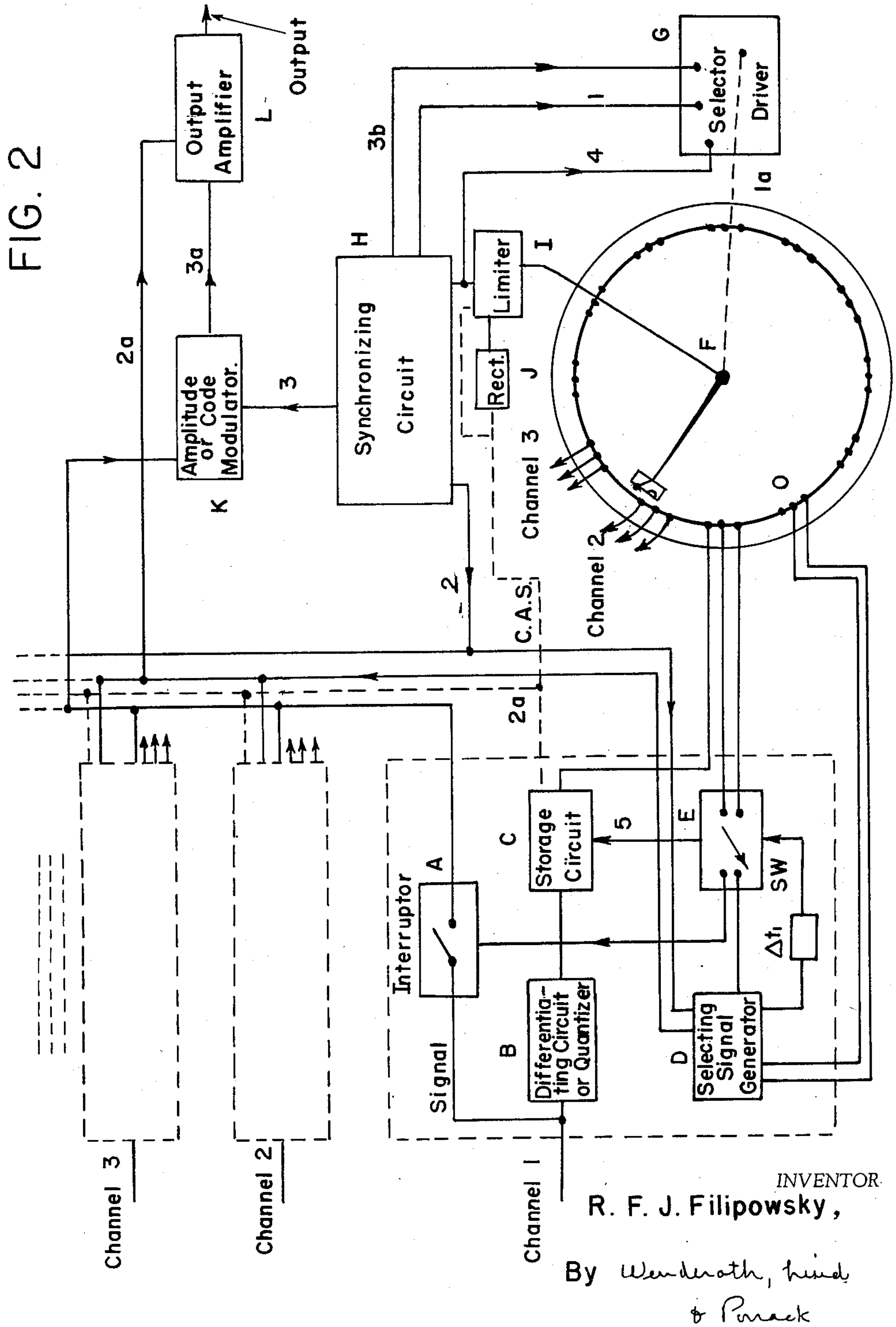
Figure 2 is a schematic diagram of the transmitting circuit.

The transmitter for this system shown in the illustrative embodiment of Figure 2 contains:

(a) A special circuit for each channel that generates a voltage dependent upon the complexity of the signal, voice, for example.

(b) A selecting circuit that automatically selects the channel which has the greatest complexity and connects it to the common output.

(c) A selecting signal generator for each channel that generates a special selecting signal as soon as the selector finds the best channel, and means for connecting this selecting signal to the common output in conjunction with the channel signal corresponding to the amplitude thereof.

(d) Circuits for synchronizing all these commutations at the every instant when they are needed by the system.

When there is a signal in channel 1 a charge is stored in a storage circuit proportional to its complexity at that moment. For this purpose, a differentiating circuit of the types already known can be used, for example, a transformer, an RC series or any other combination of elementary circuits.

This is followed by a storage circuit such as a condenser, which is charged by the differentiating current.

Figure 3:
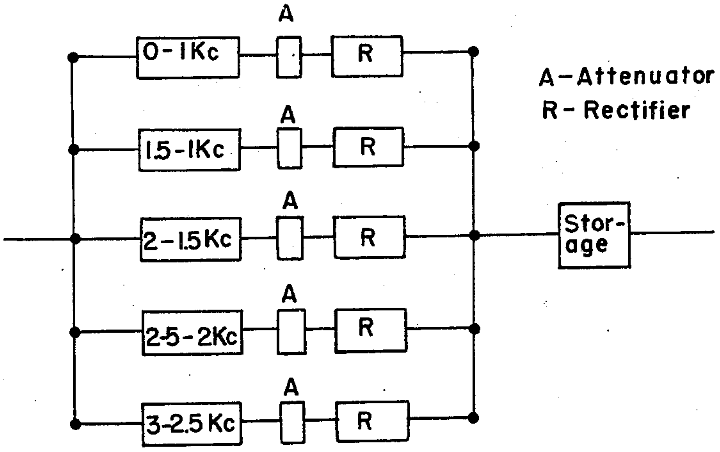
Figure 3 shows another arrangement for deriving a signal for the storage circuit C in Figure 2 corresponding to the instantaneous complexity of the signal in the channel.

Another way of reaching the same results consists in using a series of pass band filters, as per Figure 3, followed by an attenuator A proportional in value to the characteristic frequency of each filter, and a rectifier R.

Use can also be made of a quantizer circuit, i. e., a circuit which divides the amplitude curve in single steps, such as that used in the PCM (pulse code modulation) systems, for example, in that described in the "Bell System Technical Journal" of January 1948, pages 1 to 43.

Figure 4:
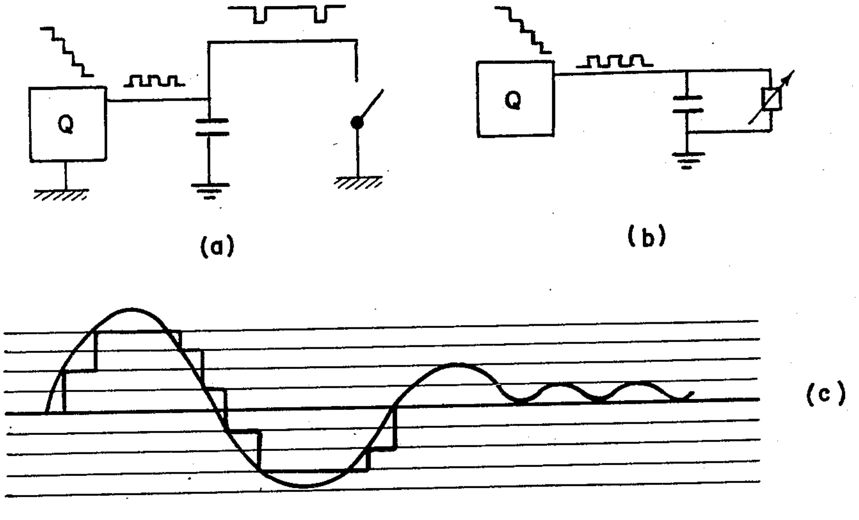
Figure 4 shows circuit diagrams and graphs illustrating the manner of discharging the storage circuits.

The charges supplied by the quantas may be stored in the storage circuit for a certain time interval and discharged by means of impulses at the end of these intervals (Figure 4a). Another method is to use a suitable resistance in parallel with the storage circuit, making in this way a continuous integration of the collected charges (Figure 4b).

The quantizer circuit is arranged in such a way that it only furnishes charges to the storage system when two quanta steps are traversed in the same direction by the amplitude curve of the signal (Figure 4c). This has the advantage of avoiding the collection of charges corresponding to small amplitudes, as are generated by noise.

The quantizer can also work in such a way that it supplies quantas of different signals for the different signals of curve slope, i. e., an amplitude increment will supply positive quantas and a decrement negative ones.

The storage system receives and keeps only the absolute value of these quantas of different polarities; therefore, the storage system will have no charge when the amplitude has the initial value or else the same value of the preceding discharge, and this happens when the quantizer supplies the same number of positive and negative quantas within a certain time interval. On the other hand, it stores a very high charge when the amplitude increases in only one direction.

Figure 5:
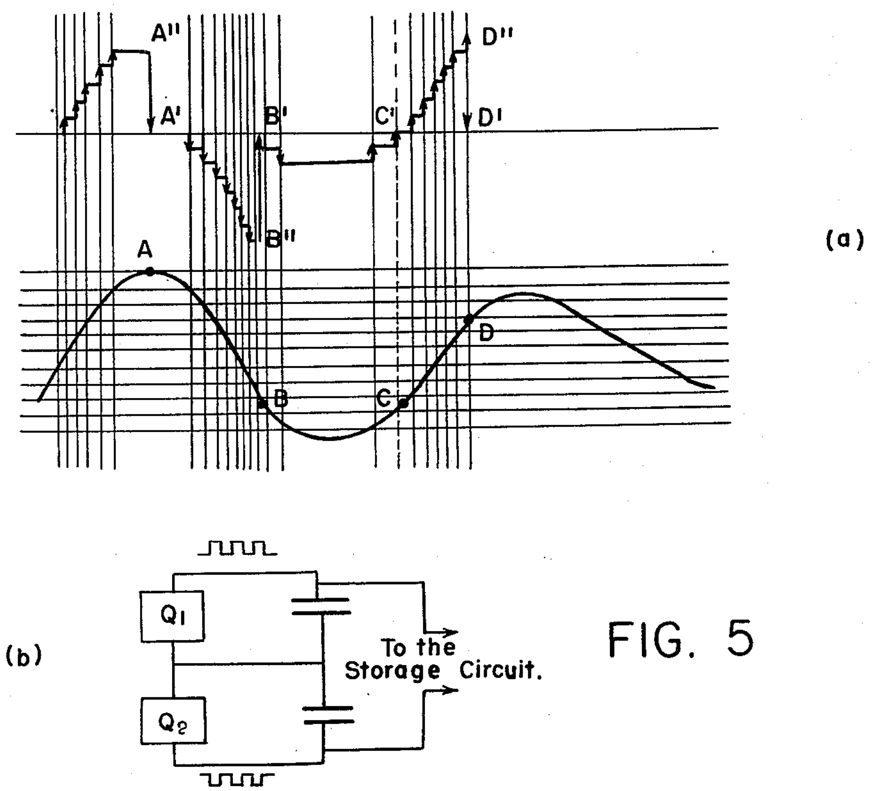
Figure 5 illustrates the manner of accumulation of impulses of different polarities as controlled by the varying slope of the signal curve.

Figure 5 shows different working points of this system.

The points A, B, C and D correspond to the amplitude values at the moments when the selector passes the channel. In A and B the charges have the values A'A" and B'B" but in C this charge is zero because the quantas in this interval have opposite signals and have the same number in both directions, i. e., increasing and decreasing. In this case the selector does not stop. In Figure 5b is shown the kind of circuit to be used for this purpose.

Figure 6:
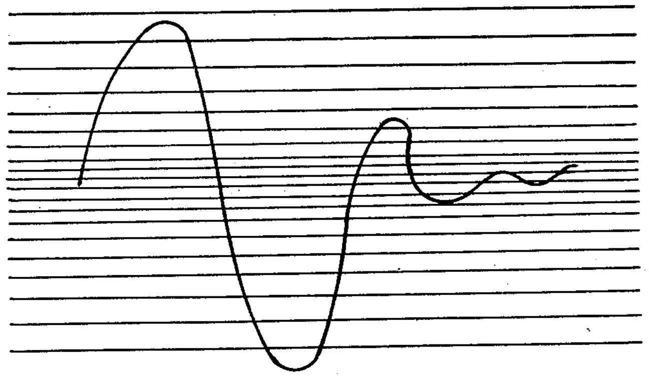
Figure 6 illustrates an arrangement for improving the signal response of low amplitude signals.
Figure 7:
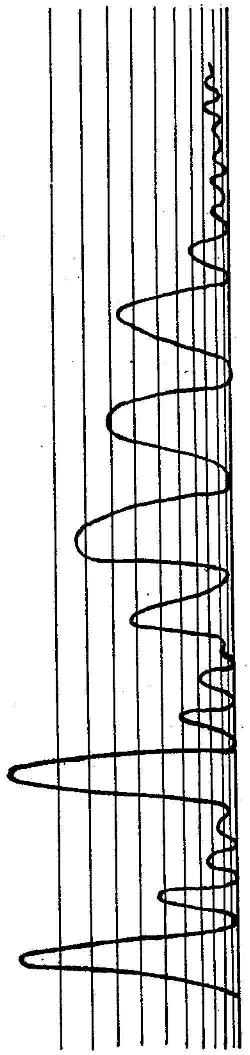
Figure 7 shows a variation of Figure 6.

In order to obtain a better response when the signal has low amplitude the quanta steps are made smaller in this region and bigger in those of the high amplitude (Figure 6). In this case there exists a direct current restoring circuit which puts the crest points of negative cycles in the zero level of the quanta characteristics (Figure 7).

Even in the case of a sudden variation of the amplitude the quantizing circuit only supplies a new charge to the storage circuit after a certain time interval.

The selector or electronic switch F; which may be an electrically rotating cathode ray switch as in F. Schröter, "Telefunken Mitteilungen, Dez. 1940," No. 85, page 21, represented in a symbolic way by a rotary switch turns with high speed starting, at the beginning of each group from point 0 by influence of starting impulse 1 (Figure 8) given by the synchronizing circuit H.

When it passes over the contact corresponding to channel 1, it gets the impulse supplied by the storage system C. If this storage is higher than a certain value, the limiter allows its passage to the selector drive G along line 4 and this makes this selector stop at the above mentioned contact.

A selector which connects at each instant the storage circuit which has the highest voltage or charge to the common output may also be used.

There are three contacts on each position of the selector. When the first two are shunted, the switch E is arranged so that it allows the channel selecting signal generator D to work.

At the proper moment, the synchronizing circuit supplies impulse 2 to the channel selecting signal generators D, although only number 1 works because it is the only one that is prepared by the switch E.

At this moment the selecting signal generator D of channel 1 sends its own code signal which is transmitted during the interval $\Delta t$ (Figure 8). Then the switch E will operate switch A which allows the amplitude sample of the signal to be transmitted so as to reach the input of modulator K. At the right moment and under the influence of impulse 3 given by H, this sample or corresponding code signal is transmitted to the output of the transmitter through the final amplifier.

In order to prepare the storage circuit for the transmission of a new sample the circuit is discharged when switch A is operated by means of impulse 5 generated by E.

Then follows impulse 3*b* which re-starts the movement of the selector. Figure 8 shows what happens afterwards. Let us assume that channel 5 has complexity enough to stop the selector, which receives the stopping impulse 4. Impulse 1 cannot now influence the driver G and this stops in position 5 until impulse 2 comes along and the transmission of the selecting signal takes place. Next follow again 5, 3 and 3*a* as before, and 3*b* changes the selector to the next position. At this moment, it is assumed that there is no other channel which has stored enough charge in the storage system to stop the selector and therefore this moves on until position 0. During the next turn it stops only in channel 4.

It is now assumed that there is no channel with complexity enough; therefore the selector passes over all contacts without stopping until it reaches 0.

For maintaining the synchronism with the receiving equipment a selecting signal is transmitted which can be that of channel 1.

This is accomplished by means of the auxiliary contacts of point 0 which, when these are short-circuited, place the selecting signal generator of channel 1 in the unlocked position and therefore able to transmit as soon as impulse 2 is received.

When all or a great part of the signals to be transmitted have complexity higher than the pre-established limit, an automatic sensitivity control is used in order to get a better distribution of the samples to the channels. In this case this limit is increased or the value of the stored energy proportionally decreased.

There also exists a resistance in parallel with every storage circuit which can be electronically regulated and influenced by the automatic sensitivity control in such a way that its value decreases when the complexity of all or the greatest part of the channels increase, or vice versa.

Figure 10:
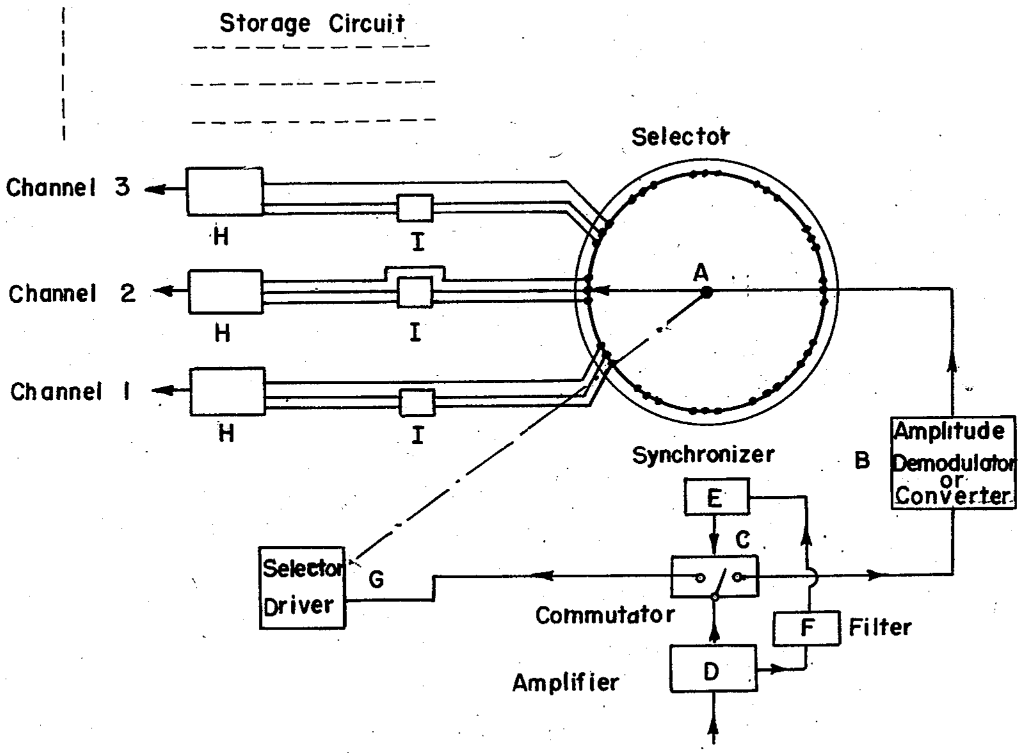
Figure 10 is a schematic diagram of a receiver which may be used in the system.

Figure 10 illustrates the receiver which may be used in the system.

The signals received are amplified and then separated in order that each sample be sent to the proper channel. For this purpose it is necessary to separate the selecting signals from the samples. This is done by means of a group consisting of a frequency filter F, synchronizer E (see B. Chance et al., "Waveforms," vol. 19, Radiation Lab. Series McGraw Hill Co. 1949, pp. 42–46) and commutator C. A signal corresponding to the group repetition frequency passes through the filter driving the synchronizer. This operates the commutator, connecting it to G during the time corresponding to the reception of the selecting signal and to B during the last part of the signal train. For maintaining the commutator in the right phase any suitable and conventional system of selecting impulses may be employed, for example, one that is used in television receivers. The details of this circuit depend upon the composition of the impulses (Figure 8, Figure 9).

In this way the selector driver G, which may be a circulation deflection circuit operating the electron beam in a cathode ray switch as in Principles of Radar McGraw Hill 1946, pp. 3–30 to 3–33, and in F. Schröter, "Telefunken Mitteilungen Dez. 1940," No. 85 page 21, puts this selector in the position that connects the right channel, and the demodulator B sends the sample to this channel.

The storage circuit H maintains the value of the received amplitude until this is discharged some moments before a new charge is received. This can be done by any suitable process. For this purpose the first two contacts of the selector can be used in such a way that when they are short-circuited they discharge the circuit after a certain time. For achieving this result a timer I is employed.

Having thus disclosed the invention, what is claimed is:

1. An electric multichannel impulse communication system using for every channel a special series of impulses and arranging these different impulse series in time-division, said system comprising means for generating a varying pulse repetition frequency, means for keeping said frequency high only as long as the complexity of the channel signal is high and for continuously lowering the same as the complexity of the signal decreases, said system also comprising a differentiating circuit and a storage system for generating a voltage which increases when the complexity of the channel signal increases, and means for changing the pulse repetition frequency of every channel in dependence on said voltage.

2. An electric multichannel impulse communication system as claimed in claim 1, comprising a quantizing circuit in every channel constituting means which delivers for every increment of the amplitude curve a corresponding voltage impulse to a storage system collecting and summarizing all these quantities and integrating them continuously, and means for changing the pulse repetition frequency of every channel in dependence on said summarized voltage.

3. An electric multichannel impulse communication system as claimed in claim 2, wherein the quantizing circuit comprises means for producing being more steps per voltage unit in the region of unequal steps with uniform height variation there the small amplitudes than in the region of the large amplitudes.

4. An electric multichannel impulse communication system as claimed in claim 3, comprising a direct current restoring circuit before the quantizing circuit, constituting means for maintaining the negative peaks of all signals at the same level of the quantizing characteristics.

5. An electric multichannel impulse communication system as claimed in claim 3, comprising an electronic switch on the transmission side constituting means for arranging the different channel signals in time-division, and for generating the varying pulse repetition frequency, said switch connecting only those channels to the output circuit which develop a voltage above a certain limit on said storage system according to the instantaneous complexity of their signals.

6. An electric multichannel impulse communication system as claimed in claim 5, comprising an automatic regulation system comprising means which changes the level of said voltage limit, said level being raised when the average complexity of the information in the channels increases and being lowered when the average complexity decreases.

7. An electric multichannel impulse communication system as claimed in claim 6, comprising an electronically regulable discharging resistance parallel to each of the said storage systems, and means for automatically making said resistance smaller when the average complexity in the channels increases and greater when the average complexity decreases.

8. An electric multichannel impulse communication system as claimed in claim 1, comprising an electronic switch on the transmission side constituting means for arranging the different channel signals in time-division and for generating the varying pulse repetition frequency, such switch connecting to the output, at every new switching action, only the channel which has developed the highest voltage or charge of all channels on its storage system.

9. An electric multichannel impulse communication system as claimed in claim 8, comprising a pulse modulator, a channel selecting signal generator and a central timer on the transmitting side constituting means which delivers starting impulses of a constant repetition frequency, to the electronic switch, to the channel selecting signal generator and to the pulse modulator, whereby that every signal group after selection by said electronic switch follows exactly after a constant interval to the preceding one.

10. An electric multichannel impulse communication system as claimed in claim 9, wherein said electronic switch has a zero position to which it returns after it is started by said starting impulses, when accidentally no channel has developed a storage voltage high enough to cause a connection, and also comprising means for transmitting a channel selecting signal, after the return of the switch to its zero position.

11. An electric multichannel impulse communication system as claimed in claim 9, comprising band-filters with very narrow bands on the receiving side constituting means for filtering said group repetition frequency out of the receiving signals and for synchronizing all switching actions in the receiver with this frequency.

12. An electric multichannel impulse communication system using for each channel a series of impulses arranged in time division and selecting the channel of highest complexity of signal message for communication during a predetermined transmission interval, comprising, in each channel, means for transmitting a signal message to a channel, means for measuring the complexity of a transmitted signal message, switching means to select the signal of highest complexity for communication in a predetermined transmission interval and synchronizing means to provide proper channel distribution for the signal message.

13. An electric multichannel impulse communication system using for each channel a special series of impulses each of which series is arranged in time division, said system comprising means for transmitting a signal message to a particular channel of the system, means for sampling each signal message to obtain sampled series of voltage impulses, means for generating at least one selecting impulse for transmission with the correspondingly sampled signal message to form a special series of impulses transmitted to each channel of the system, means for generating an impulse repetition frequency for each special series of impulses to each channel, said impulse repetition frequency varying according to the complexity of the signal message, said impulse repetition frequency generating means comprising in each channel a differentiating circuit, a storage system to generate a voltage increasing in proportion to the increase in complexity of the signal message and means to change the repetition frequency depending upon the voltage generated by said storage system.

14. An electric multichannel impulse communication system using for each channel a series of impulses arranged in time division and selecting the channel of highest complexity of signal message for communication during a predetermined transmission interval, comprising, in each channel, means for transmitting a signal message to a channel, means for measuring the complexity of a transmitted signal message, switching means to select the signal of highest complexity for communication in a predetermined transmission interval synchronizing means to provide proper channel distribution for the signal message, and a receiver comprising means to separate the selecting impulse from the sampled signal message, means to select the proper receiver channel to carry the sample signal message and demodulator means to reconstruct an intelligible signal from the sampled signal message in the receiver.

15. A multichannel system as in claim 14 wherein said demodulator means includes a timing means and a storage means.

References Cited in the file of this patent

UNITED STATES PATENTS

| Number | Name | Date |
|---|---|---|
| 1,873,786 | Ranger | Aug. 23, 1932 |
| 2,372,593 | McWhirter et al. | Mar. 27, 1945 |
| 2,412,974 | Deloraine | Dec. 24, 1946 |
| 2,425,066 | Labin | Aug. 5, 1947 |